June 29, 1926.
S. C. PROBERT ET AL
1,590,314
APPARATUS FOR ARC SPOT WELDING
Filed March 28, 1923      3 Sheets-Sheet 3
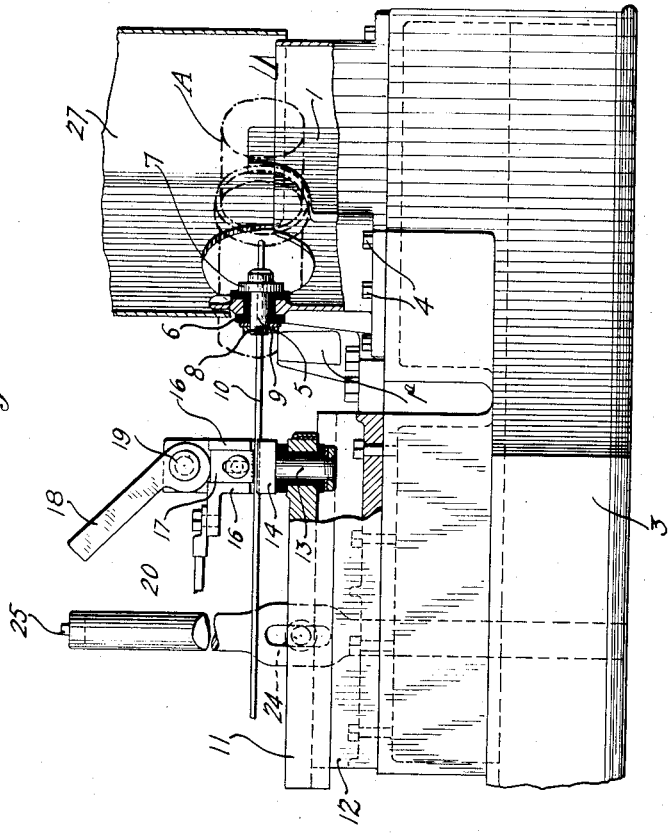
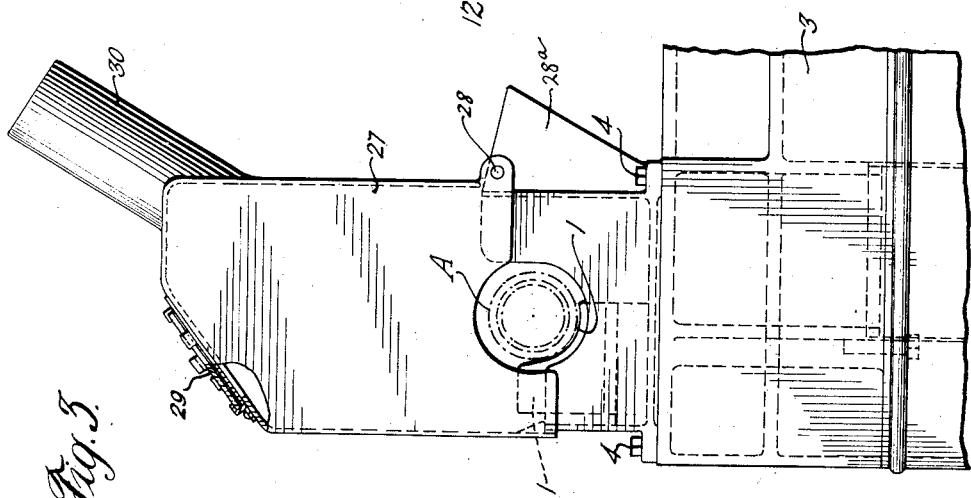
Inventors
Sidney C. Probert
Frederick J. Lamborn
By their Attorneys
Newell & Spencer Patented June 29, 1926.

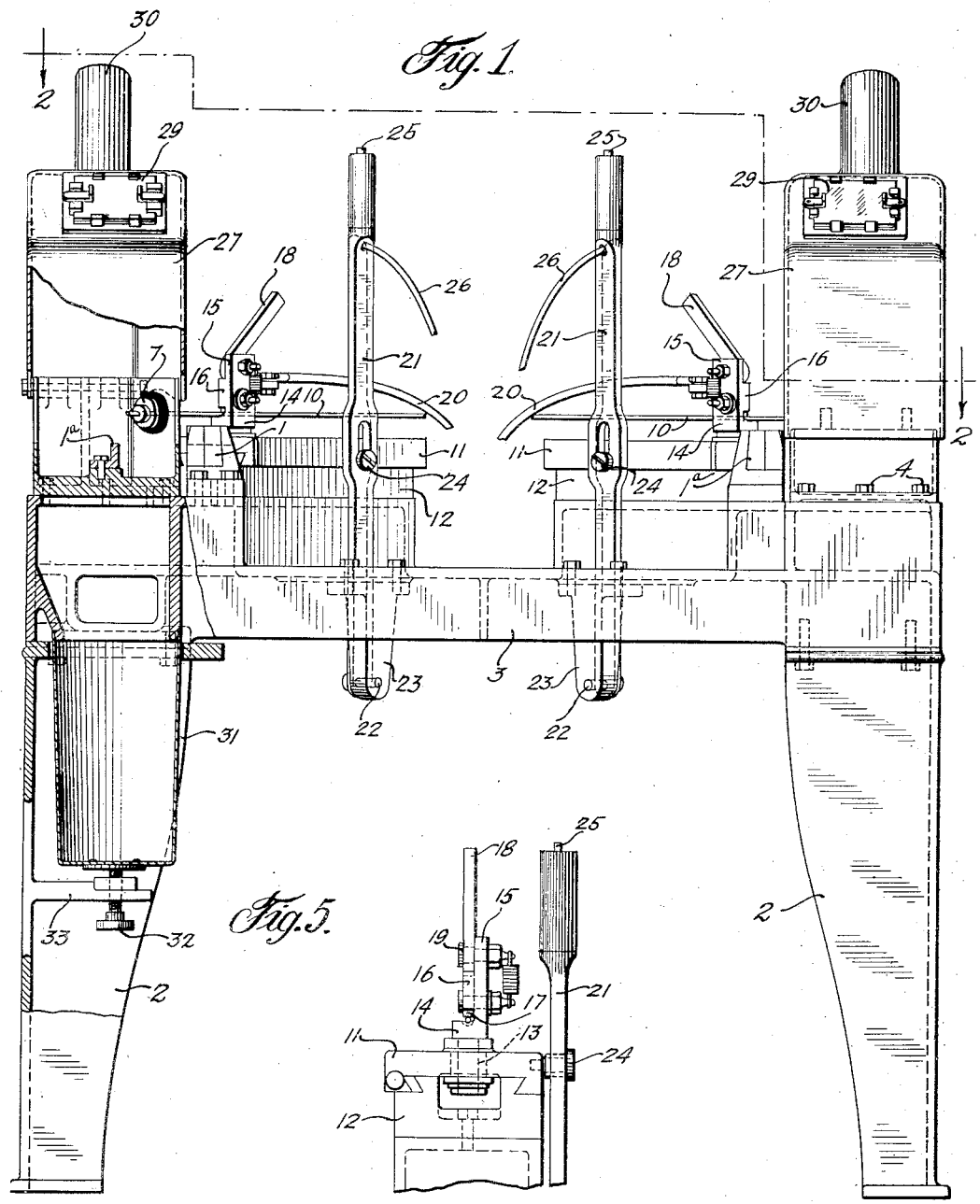

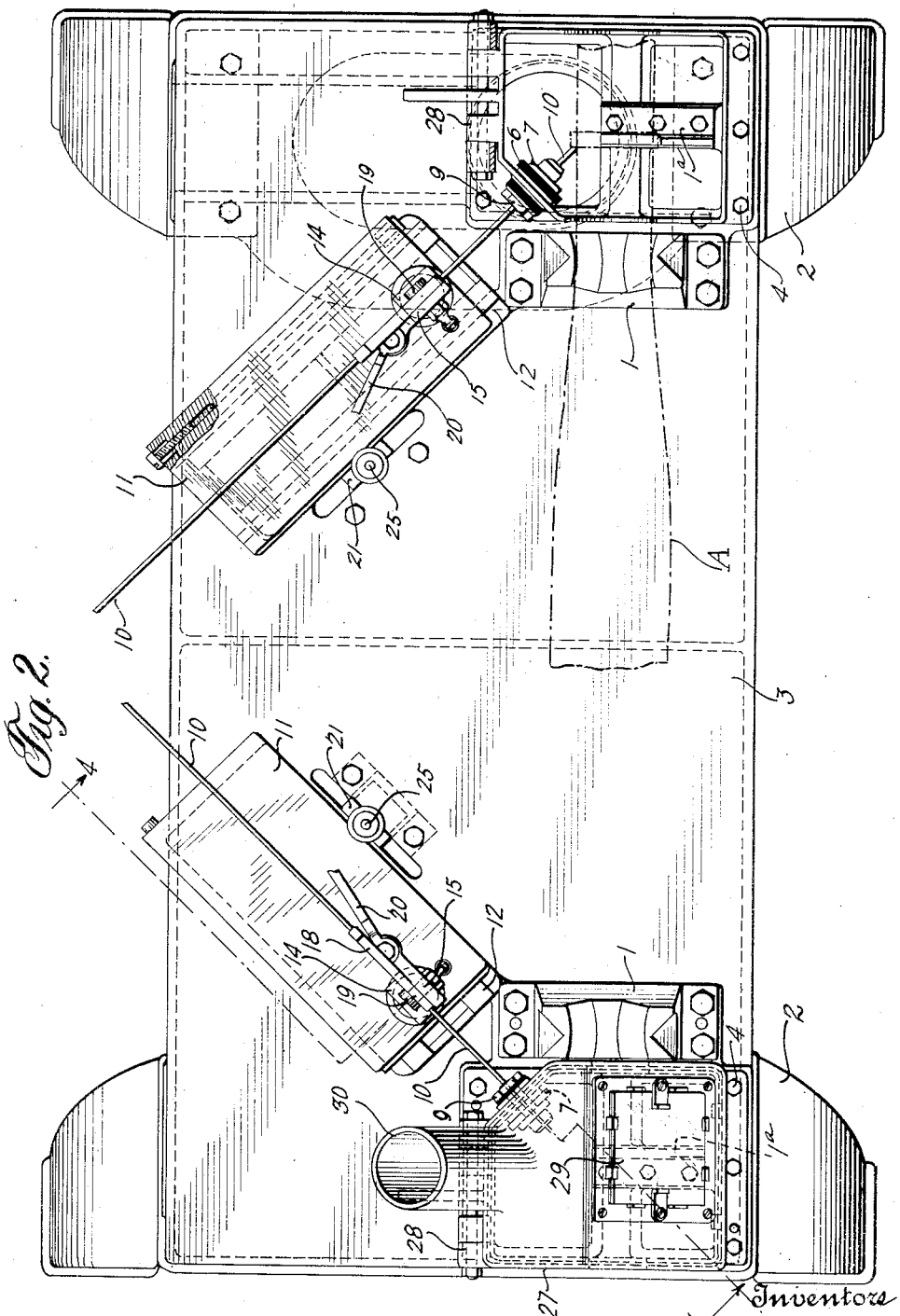

1,590,314

UNITED STATES PATENT OFFICE.

SIDNEY C. PROBERT AND FREDERICK J. LAMBORN, OF DETROIT, MICHIGAN, ASSIGNORS, BY MESNE ASSIGNMENTS, TO DODGE BROTHERS, INC., A CORPORATION OF MARYLAND.

APPARATUS FOR ARC SPOT WELDING.

Application filed March 28, 1923. Serial No. 628,214.

Our invention relates to the art of welding, and is more particularly concerned with the use of an electric arc for forming a weld at a plurality of points or spots. We are aware that spot welding is not new but we believe that it is new to use arc welding equipment for this purpose.

In carrying out our invention various forms of apparatus may be employed, that shown in the accompanying drawings being a preferred form.

In said drawings—

Figure 1 is a front elevation with some of the parts broken away and shown in section;

Fig. 2 is a view taken on the line 2—2 of Fig. 1;

Fig. 3 is a side elevation;

Fig. 4 is a view taken on the line 4—4 of Fig. 2, and

Fig. 5 is a detail showing a front view of a portion of the parts associated with the electrode supporting carriage.

We have illustrated a form of apparatus adapted to weld a collar to a rear axle housing used in automobile construction, there being a collar at each end of the housing situated just inside the spring seats. The apparatus is designed to perform welding operations on both collars at the same time, or substantially so, and to do this two operators are required and the welding equipment is therefore duplicated except for a common supporting structure.

In the drawings the rear axle housing is shown at A, in dot-and-dash lines, and during the welding operation is supported on V blocks 1, in turn carried by a supporting structure having legs 2 and a cross piece 3. The housing is located longitudinally by the stops 1ª against which its ends abut. Carried by the supporting structure and secured to it in any desired way, as, for instance, by means of bolts 4, is a welding chamber. This chamber has lateral plates which form substantially a rectangle, except that one of the corners is flattened and is apertured for the purpose of accommodating a sleeve 5, Fig. 4, said sleeve being insulated from the wall of the chamber by suitable insulating materials 6. The sleeve has a collar 7 on one end and is screw-threaded at 8 to receive securing nuts 9.

Projecting through the sleeve and protruding into the chamber is an electrode 10. This is supported for reciprocation in a carriage comprising a member 11 which is dovetailed to slide on a member 12 secured to the cross piece 3. Projecting through an aperture in the member 11 and suitably insulated therefrom is a pin 13 made as a part of or secured to a block or bracket 14. This block is the means through which the electrode is conveniently clamped for movement with the carriage and to which an electric lead is attached. The block has a vertically extending portion 15 with guideways 16, suitably formed, for guiding a clamping piece 17. This piece is slotted and a pin passing through a slot and into 15 permits limited movement of the clamping piece, and its lower face is serrated for engaging and firmly holding the electrode in place as shown in Figs. 4 and 5. A lever 18 is also pivoted to 15 and 19 and as the electrode wastes away during welding operations the clamp is released by upward movement of the lever and the electrode may then be fed forward a suitable distance.

An electric lead 20 for supplying the welding current to the electrode, is secured to a laterally projecting arm of the block 14.

Reciprocation of the carriage is brought about through means of a lever 21 pivoted at 22 to an extension 23 bolted to the cross piece 3. This lever is connected by a pin and slot connection 24 to the carriage, as shown in Figs. 1, 4 and 5. In the upper end of the lever 21 there is a push button 25 which when depressed causes a circuit to be closed which circuit includes the lead 26, and which lead is connected to a relay circuit which in turn operates a switch for supplying the electrode 20. The details of these connections are not shown, as their construction is well known.

The current is grounded through the supporting structure which is of metal.

Since the welding arc is of extreme brightness, it would be injurious to the eyes of the operator if protecting means were not used. To this end the welding chamber has a top 27 rectangular in cross section and hinged at 28 to the welding chamber. This top is provided with an aperture near its upper end through which the progress of the weld may be observed, and this aperture is closed by some sort of stained glass 29 for protecting the eyes of the operator. There is also a short chimney 30 connected with the top to carry off any gases which may be formed.

The top 27 is swung back on its hinge to permit the axle housing to be adjusted into place on its supporting blocks 1, being limited in its backward movement by the ledge 28ª. The top is suitably cut away to fit around the axle housing during the welding process and slightly overlaps the front and side walls of the welding chamber.

Secured underneath the welding chamber is a canlike receptacle 31, Fig. 1, to catch the droppings from the welding operation. The upper end of this receptacle overlaps the lower end of the welding chamber which has a circular portion for this purpose, and the receptacle is held in place by a screw 32 bearing against the bottom of the receptacle as shown in Fig. 1, a bracket 33 projecting laterally from the leg 2 serving as a support for the screw.

It will be understood that while we have described only one welding chamber, electrode, carriage and associated parts, it is to be understood that all these are duplicated. The operator stands near each lever 21 and when the axle housing is in place the welding arc is formed on depressing the button 25 associated with each lever. After the arc has caused a weld to be made at one spot, the axle housing is rotated and the arc is again formed at another spot and the parts are welded together at this spot.

Thus the new process results in a welding together of two pieces of metal by forming an arc at several discontinuous spots over the surface.

In the welding of collars to a rear axle housing we make the weld at four spots only, although a different number of welds may be made if desired.

What we claim as new is:

1. In a machine of the character described, a supporting structure having a chamber within which the parts to be welded are supported, an arc-forming electrode protruding into said chamber, a slide supporting said electrode, a lever for reciprocating said slide and a push rod associated with said lever for controlling the current to form the arc.

2. In a machine of the character described, a supporting structure having a welding chamber laterally closed except for an aperture in one of its sides, a sleeve secured in said aperture, an arc-forming electrode slidable in said sleeve, a carriage for supporting said electrode, means for controlling current to said electrode and a connection from said means to the carriage for reciprocating the same.

3. In a machine of the character described, a supporting structure for rounded elements to be welded, permitting rotation of the elements, a chamber on the supporting structure within which the rounded elements to be welded are rotatably supported, an arc-forming electrode protruding into said chamber, and means for reciprocating the electrode.

4. In a machine of the character described, a supporting structure for rounded elements, permitting free rotation of the elements, a chamber on the supporting structure within which the rounded elements to be welded are rotatably supported, an arc-forming electrode protruding into said chamber, means for reciprocating said electrode, and means for controlling the current to form the arc carried by and controllable from said electrode reciprocating means.

Signed at Detroit, Michigan, this 23 day of March 1923.

SIDNEY C. PROBERT.
FREDERICK J. LAMBORN.